United States Patent
Cai et al.

(10) Patent No.: US 10,956,915 B2
(45) Date of Patent: Mar. 23, 2021

(54) CONFORMITY DETERMINATION OF CROSS-REGIONAL AFFAIRS

(71) Applicant: International Business Machines Corporation, Armonk, NY (US)

(72) Inventors: Ke Ke Cai, Beijing (CN); Hong Lei Guo, Beijing (CN); Zhi Li Guo, Beijing (CN); Feng Jin, Beijing (CN); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 15/226,055

(22) Filed: Aug. 2, 2016

(65) Prior Publication Data

US 2018/0039994 A1 Feb. 8, 2018

(51) Int. Cl.
   *G06Q 30/00* (2012.01)
(52) U.S. Cl.
   CPC .................. *G06Q 30/018* (2013.01)
(58) Field of Classification Search
   CPC .................................. G06Q 30/018
   See application file for complete search history.

(56) References Cited

U.S. PATENT DOCUMENTS

| | | | | |
|---|---|---|---|---|
| 4,376,932 A * | 3/1983 | Cassada | | G06T 3/00 |
| | | | | 382/216 |
| 7,117,172 B1 * | 10/2006 | Black | | G06Q 40/00 |
| | | | | 705/35 |
| 9,679,254 B1 * | 6/2017 | Mawji | | G06F 16/24578 |
| 2002/0023109 A1 * | 2/2002 | Lederer, Jr. | | G06Q 10/10 |
| | | | | 715/255 |
| 2004/0117337 A1 * | 6/2004 | Beck | | G06Q 10/10 |
| 2005/0005266 A1 * | 1/2005 | Datig | | G06N 5/02 |
| | | | | 717/136 |
| 2005/0228688 A1 * | 10/2005 | Visser | | G06Q 10/10 |
| | | | | 340/691.3 |

(Continued)

OTHER PUBLICATIONS

Wang et al. "A Neural Transition-Based Approach for Semantic Dependency Graph Parsing", Research Center for Social Computing and Information Retrieval Harbin Institute of Technology, Harbin China 2018 (Year: 2018).*

(Continued)

*Primary Examiner* — Paul R Fisher
(74) *Attorney, Agent, or Firm* — Scully, Scott, Murphy & Presser, P.C.; Joseph Petrokaitis, Esq.

(57) ABSTRACT

A method, a device and a computer program for conformity determination of cross-regional affairs. The method comprises obtaining characteristics from a description of an affair at least crossing a local region and a non-local region. The method further comprises generating a multi-level constraint based on the characteristics from a knowledge base, and the knowledge base includes regulations for cross-regional affairs, and the multi-level constraint includes a local constraint associated with the local region and a non-local constraint associated with the local region and the non-local region. Moreover, the method also comprises determining conformity of the affair to the multi-level constraint. The method can determine the conformity of the cross-regional affairs automatically, thereby reducing the consumption of human resources and the inconformity risk in the cross-regional affairs.

16 Claims, 4 Drawing Sheets

(56) References Cited

U.S. PATENT DOCUMENTS

| | | | |
|---|---|---|---|
| 2007/0203718 A1* | 8/2007 | Merrifield, Jr. | G06Q 10/0635 |
| | | | 705/317 |
| 2011/0119047 A1* | 5/2011 | Ylonen | G06F 40/30 |
| | | | 704/9 |
| 2012/0303525 A1 | 11/2012 | Sahadevan | |
| 2013/0311387 A1 | 11/2013 | Schmerler | |
| 2014/0101062 A1* | 4/2014 | Beigel | G06Q 30/018 |
| | | | 705/317 |
| 2014/0129457 A1* | 5/2014 | Peeler | G06Q 10/067 |
| | | | 705/317 |
| 2014/0207633 A1* | 7/2014 | Aldrich | G06Q 30/018 |
| | | | 705/31 |
| 2014/0244344 A1* | 8/2014 | Bilet | G16H 40/20 |
| | | | 705/7.28 |
| 2014/0279440 A1* | 9/2014 | Felix | G06Q 10/0831 |
| | | | 705/39 |
| 2015/0276876 A1* | 10/2015 | Jin | G06K 9/62 |
| | | | 382/103 |
| 2016/0092686 A1* | 3/2016 | Barlett | G06F 21/604 |
| | | | 726/22 |
| 2016/0125422 A1* | 5/2016 | Blanco | G06Q 40/08 |
| | | | 705/4 |
| 2016/0132896 A1* | 5/2016 | Guerin | G06Q 30/018 |
| | | | 705/317 |
| 2016/0275448 A1* | 9/2016 | Bennett | G06F 17/30327 |
| 2016/0350885 A1* | 12/2016 | Clark | G06Q 30/0609 |

OTHER PUBLICATIONS

L. Thorne McCarty, "Deep Semantic Interpretations of Legal Texts" Department of Computer Science Rutgers University, New Brunswick, NJ 2007 (Year: 2007).*

Dipanjan Das, "Semi-Supervised and Latent-Variable Models of Natural Language Semantics", Language Technologies Institute School of Computer Science Carnegie Mellon University Pittsburgh PA 2012 (Year: 2012).*

Law et al., "REGNET: Regulatory Information Management, Compliance and Analysis", Engineering Informatics Group, Department of Civil and Environment Engineering, Stanford University, Stanford, CA, in Government Information Quarterly May 31, 2014, 8 pages.

* cited by examiner

CONFORMITY DETERMINATION OF CROSS-REGIONAL AFFAIRS

BACKGROUND

Cross-regional affairs generally relate to many different regulations on the same topic or theme. For example, different regions may have different regulations for the same affair. In the transaction compliance audit, the staffs need to study all the related regulations from different regions in order to check the compliance of the transaction. As a result, it requires much more efforts to identify the difference and compliance risk against these regulations. For example, some organizations may put tens of thousands of employees to work on compliance checking because the cost is very expensive if an affair is in incompliance with the regulations.

Generally, the term in regulations is abstract constraint description, for example, a domestic enterprise, while the entity in the affairs or transactions is usually individual or detail information, for example, a specific company name. Thus, it is a big challenge to figure out whether the detail information in the affairs or transactions conforms to the current regulations. However, traditional methods merely provide some text comparisons among regulations, for example, there is provided a regulatory compliance assistance framework which may link to any reference regulation provisions and display terms and definitions. Therefore, the traditional methods could not figure out semantic constraint on the cross-regional affair among the regulations.

SUMMARY

Example embodiments of the present disclosure provide a method, a device, and a computer program product for conformity determination of cross-regional affairs.

In an aspect, a computer-implemented method is provided. The method comprises obtaining characteristics from a description of an affair at least crossing a local region and a non-local region. The method further comprises generating a multi-level constraint based on the characteristics from a knowledge base, wherein the knowledge base includes regulations for cross-regional affairs, and the multi-level constraint includes a local constraint associated with the local region and a non-local constraint associated with the local region and the non-local region. Moreover, the method also comprises determining conformity of the affair to the multi-level constraint.

In another aspect, a device is provided. The device includes a processing unit and a memory coupled to the processing unit and storing instructions thereon. The instructions can be executed by the processing unit to perform acts including: obtaining characteristics from a description of an affair at least crossing a local region and a non-local region; generating a multi-level constraint based on the characteristics from a knowledge base; and determining conformity of the affair to the multi-level constraint.

In yet another aspect, a computer program product is provided. The computer program product is tangibly stored on a non-transient machine-readable medium and comprises machine-executable instructions. When executed on a device, the instructions cause the device to obtain characteristics from a description of an affair at least crossing a local region and a non-local region; to generate a multi-level constraint based on the characteristics from a knowledge base; and to determine conformity of the affair to the multi-level constraint.

According to embodiments of the present disclosure, the conformity of the affair can be automatically determined without any manual operation, thereby reducing the consumption of human resources and the inconformity risk in the cross-regional affairs. Moreover, the multi-level constraint can be accurately generated based on the type of the affair and the location at which the affair is to be executed. Further, the embodiments of the present disclosure can provide the result of conformity determination to the users, and the embodiments of the present disclosure can provide some related regulations with which the affair does not comply in the case that the affair involves an aspect of inconformity.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to". The term "based on" is to be read as "based at least in part on". The term "one embodiment" and "an embodiment"

are to be read as "at least one embodiment." The term "another embodiment" is to be read as "at least one other embodiment".

In the embodiments of the present disclosure, the term "affair" is to be read as a transaction deal between two or more entities, it is also referred to as "transaction", "contract" and so forth. As used herein, the term "region" refers to a country, a state, a province, or an area within a country. The term "conformity" means that the affair conforms to the regulations, it is also referred to as "compliance", "consistent" and so forth. The term "regulations" may include laws, regulations and policies of both local region and non-local regions. Other definitions, explicit and implicit, may be included below.

Figure 1:
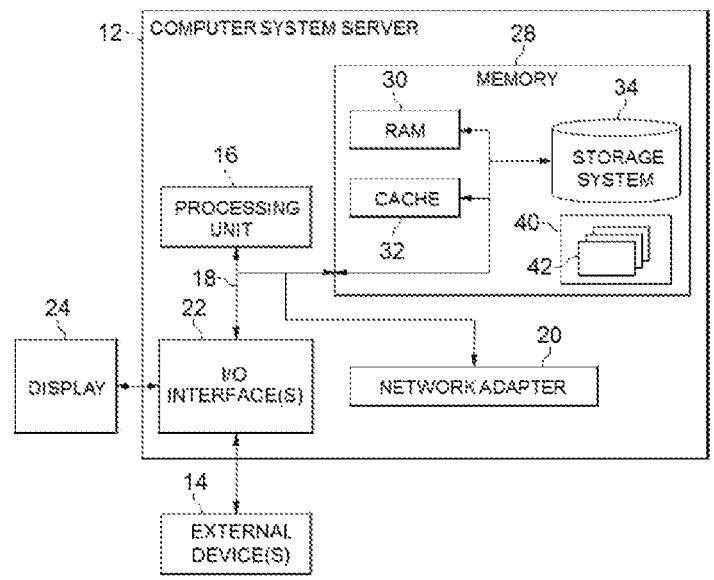
FIG. 1 is a block diagram of a computer system/server 12 suitable for implementing embodiments of the present disclosure.

Reference is first made to FIG. 1, in which an exemplary computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Now some example embodiments of the present disclosure will be described. As mentioned above, conventional ways for determining conformity of the cross-regional affairs are performed manually. This process will consume considerable human resources and might miss some fatal regulations. In order to reduce non-compliance risk in the cross-regional affairs, deep regulation understanding is very important way of compliance determination. According to embodiments of the present disclosure, conformity of the cross-regional affairs is determined automatically, thereby reducing the consumption of human resources and the inconformity risk in the cross-regional affairs.

For example, an entity M and an entity N make a cross-regional transaction at region A. The cross-regional transaction should comply with the regulations for cross-regional affairs, which comprises a local constraint associated with the region A and a non-local constraint associated with the local and non-local regions. The transaction may be regarded as the term "affair" in the following embodiments, that is, a transaction may be an example of an affair.

Figure 2:
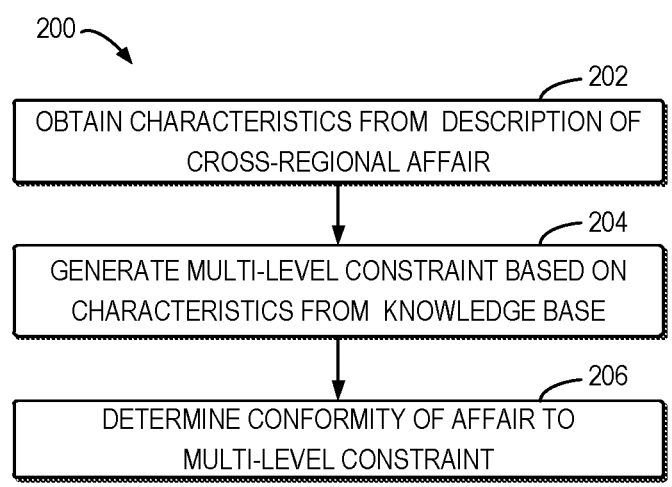
FIG. 2 is a flowchart of a method 200 for determining conformity of cross-regional affairs in accordance with embodiments of the present disclosure.

FIG. 2 is a flowchart of a method 200 for determining conformity of cross-regional affairs in accordance with embodiments of the present disclosure. In step 202, characteristics are obtained from a description of an affair, and the affair at least crosses a local region and a non-local region. For example, the affair may be a transaction and contract between two or more entities, and each entity may be a person or an organization. That is, a plurality of characteristics may be extracted from the transaction or the contract by using characteristic recognition model.

In some embodiments, the characteristics may include at least one of affair information about the affair and entity information about an executive entity for the affair. Examples of the affair information include, but are not limited to, location, time, number, industry, amount of money and ratio of return of the affair, and the entity information may include, but are not limited to, natural attribute (such as gender, nationality), social role (such as state-owned enterprise, foreign enterprise), social attribute (such as qualification, certificate) and social relation (such as subsidiary, relative) of the entity.

Next, the method 200 proceeds to step 204, where a multi-level constraint is generated based on the characteristics from a knowledge base, wherein the knowledge base includes regulations for cross-regional affairs, and the multi-level constraint includes a local constraint associated with the local region and a non-local constraint associated with the local region and the non-local region. For example, the non-local constraint may be a global consistent constraint, while the local constraint may be a local specific constraint.

In some embodiments, the knowledge base may store existing laws, regulations and policies of both local region and non-local regions. In some embodiments, an example of the non-local constraint may be that the investor should be a manufacturing enterprise, and an example of the local constraint may be that the investor should not be a foreign enterprise. The constraint may be represented as conformity and inconformity, and thus the example of the non-local constraint may be represented as: investor {conformity: manufacturing enterprise}, and the example of the local constraint may be represented as: investor {inconformity: foreign enterprise}.

In step 206, conformity of the affair to the multi-level constraint is determined. Still consider the example embodiments where the non-local constraint comprises that the investor should be a manufacturing enterprise and the local constraint comprises that the investor should not be a foreign enterprise. In such embodiments, if a foreign manufacturing enterprise wants to make an investment deal with a domestic enterprise in this local region, then this investment deal is in conformity with the non-local constraint, but it is in inconformity with the local constraint because the investor is a foreign enterprise. As a result, it is determined that this investment deal is in inconformity with the regulations. Accordingly, the embodiments of method 200 can reduce the consumption of human resources and the inconformity risk in the cross-regional affairs by automatically determining the conformity of the affair.

It is to be understood that although step 202 is shown prior to step 204, this is merely for the purpose of illustration without suggesting any limitation as to the scope of the present disclosure. In some embodiments, these two steps can be carried out in parallel. That is, it is possible to use a single instruction to obtain the characteristics and generate the multi-level constraint.

Figure 3A:
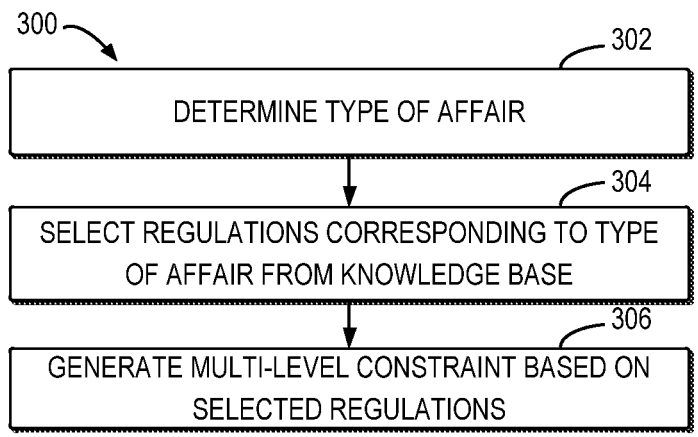
FIG. 3A is a flowchart of a method 300 for generating the multi-level constraint in accordance with embodiments of the present disclosure.

FIG. 3A is a flowchart of a method 300 for generating the multi-level constraint in accordance with embodiments of the present disclosure. It will be understood that the method 300 may be regarded as a specific implementation of the step 204 in the method 200 with respect to FIG. 2. In step 302, a type of the affair is determined. In some embodiments, the type may represent a kind of the transaction or contract, and the type may be, but is not limited to, investment, lease, agency, permission and so forth.

In step 304, regulations corresponding to the type of the affair are selected from the regulations stored in the knowledge base. For example, if the affair is a type of investment deal, the investment related regulations are selected from the knowledge base. In step 306, the multi-level constraint for the characteristics is generated based on the selected regulations. Still considering the example that the affair is a type of investment deal, a multi-level constraint suitable for the investment may be generated.

Figure 3B:
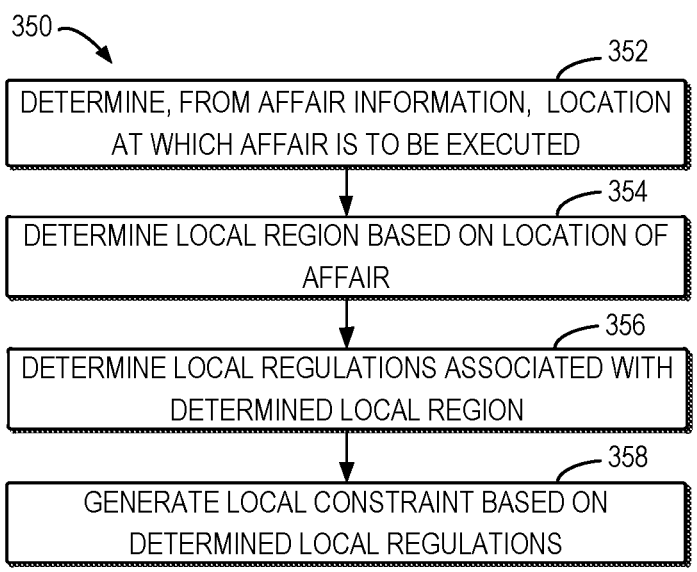
FIG. 3B is a flowchart of a method 350 for generating the local constraint in accordance with embodiments of the present disclosure.

FIG. 3B is a flowchart of a method 350 for generating the local constraint in accordance with embodiments of the present disclosure. It will be understood that the method 350 may be regarded as a specific implementation of the step 204 in the method 200 with respect to FIG. 2. In step 352, a location at which the affair is to be executed is determined from the affair information. Since different regions may have different regulations on the same topic or theme, for example, the region A may ban exports to the region B, while the region C may allow exports to the region B, the location of the affair needs to be determined. In some embodiments, the location may be a state or a city. In step 354, the local region is determined based on the location of the affair. For example, if the location of the affair is a city in region A, it can be determined that the local region is the region A. Next, in step 356, the local regulations associated with the determined local region are determined from the regulations stored in the knowledge base. For example, the local regulations for region A are generated from the knowledge base. In step 358, the local constraint for the characteristics is generated based on the determined local regulations. Considering the embodiment that the local region is the region A, a local constraint suitable for the region A is generated, which means that the affair should conform to the regulations of the region A, for example, goods cannot be exported to the region B.

In some embodiments, the conformity of the affair to the multi-level constraint may include first conformity and second conformity. The first conformity is determined based on the affair information, while the second conformity is determined based on the entity information. That is, in the case that the characteristics include affair information about the affair and entity information about an executive entity for the affair, both the affair information and entity information should be checked against the multi-level constraint. In some embodiments, the affair will be determined to be allowable only if both the first conformity and the second conformity are satisfied. Thus, the multi-level constraint can be accurately generated based on the type of the affair by means of the method 300, and the local constraint can be accurately generated based on the location at which the affair is to be executed by means of the method 350. Moreover, by use of two types of conformities, the conformity of the affair can be enhanced.

Figure 4:
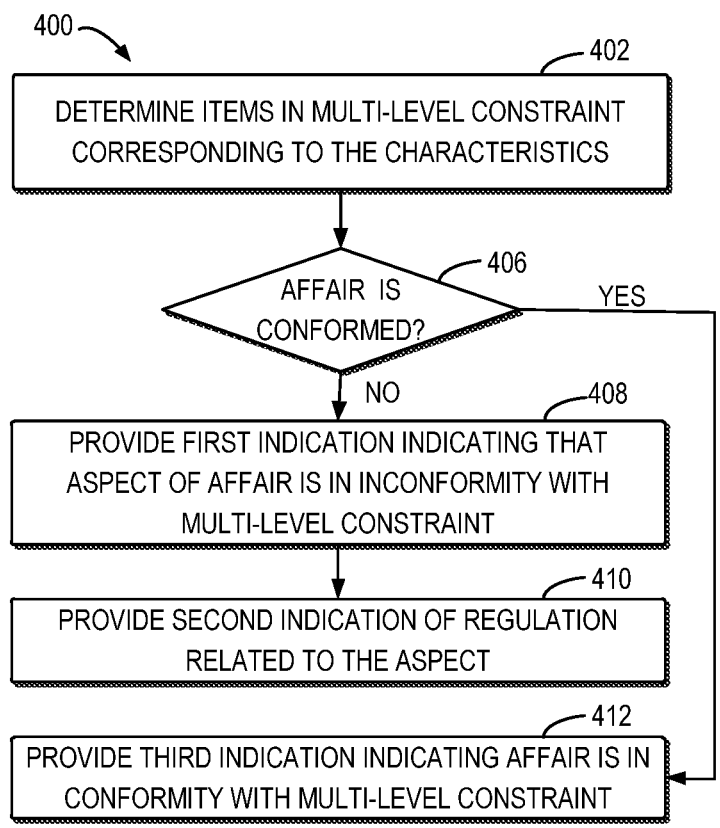
FIG. 4 is a flowchart of a method 400 for providing an indication indicating the conformity of cross-regional affairs in accordance with embodiments of the present disclosure.

FIG. 4 is a flowchart of a method 400 for providing an indication indicating the conformity of cross-regional affairs in accordance with embodiments of the present disclosure. The method 400 starts after generating a multi-level constraint based on the characteristics from a knowledge base in step 204 in method 200.

In step 402, items in the multi-level constraint corresponding to the characteristics are determined. For example, a template that indicates a plurality of definitions of characteristics to be obtained may be generated firstly, and the extraction patterns for the template are created manually or automatically. Then, a process of pattern matching is performed by means of the extraction patterns between the template and the description of the affair in order to obtain the characteristics associated respectively with the definitions in the template. Accordingly, each of the obtained characteristics may be tagged with a definition of the characteristic after the characteristics are obtained from the description of the affair. Moreover, each item in the multi-level constraint together with a definition thereof also may be obtained by means of the similar pattern matching process. Then, cross-regional constraint linkage may be performed for each characteristic by matching the definitions of the characteristics and the items. In this way, each of the characteristics may be aligned to an item in the multi-level constraint corresponding to the definition of the characteristic.

In some embodiments, for example, the multi-level constraint may be represented as a tree as illustrated in the below FIG. 5A or 5B, the tree includes a plurality of nodes, and each node may indicate an item related to the local constraint or the non-local constraint. In some embodiments, the tree is searched or traversed to look for nodes indicating the items corresponding to the characteristics. For example, each of the characteristics is aligned to a node in the tree based on semantic feature vector of its definition and background in the regulations, and the multi-level constrain association is performed for the affair.

In step 406, it is determined whether the characteristics conform to the multi-level constraint on the items. For example, the constraint conformity analysis is performed with deep semantic association to determine whether the affair is in conformity with the multi-level constraint.

If it is determined that an aspect of the affair is in inconformity with the multi-level constraint, the method proceeds to step 408, where a first indication of the aspect of the affair is provided, which indicates that the aspect of the affair is inconformity with the multi-level constraint. Then, in step 410, a second indication indicating regulation(s) related to the aspect is provided. For example, it is assumed that the local constraint is represented as follows: investor {inconformity: foreign enterprise}. If a foreign manufacturing enterprise wants to make an investment deal with a domestic enterprise in this local region, this investment deal is in inconformity with the local constraint because the investor is a foreign enterprise. Accordingly, a first indication may be provided to indicate that the executive entity for the investment deal is in inconformity with the local constraint. Additionally, a second indication may be provided to indicate a regulation that the executive entity for the investment deal should not be a foreign enterprise. In this way, if the affair is incompliant, the entity of the affair may be aware of the reasons why the affair is incompliant, and then the entity can modify or withdraw the description of the affair (such as, transaction or contract) in order to comply with the regulations.

On the other hand, if it is determined in step 406 that all aspects of the affair are in conformity with the multi-level constraint, the method 400 proceeds to step 412. In this step, a third indication is provided, which indicates that the affair is in conformity with the multi-level constraint. That is, the description of the affair, such as, transaction or contract, complies with the regulations. According to the embodiments of method 400, the result of conformity determination can be provided to the users, and some related regulation(s) with which the affair does not comply can be also provided in the case that the affair involves an aspect of inconformity. Thus, the efficiency of conformity determination of the affair can be greatly increased.

Figure 5A:
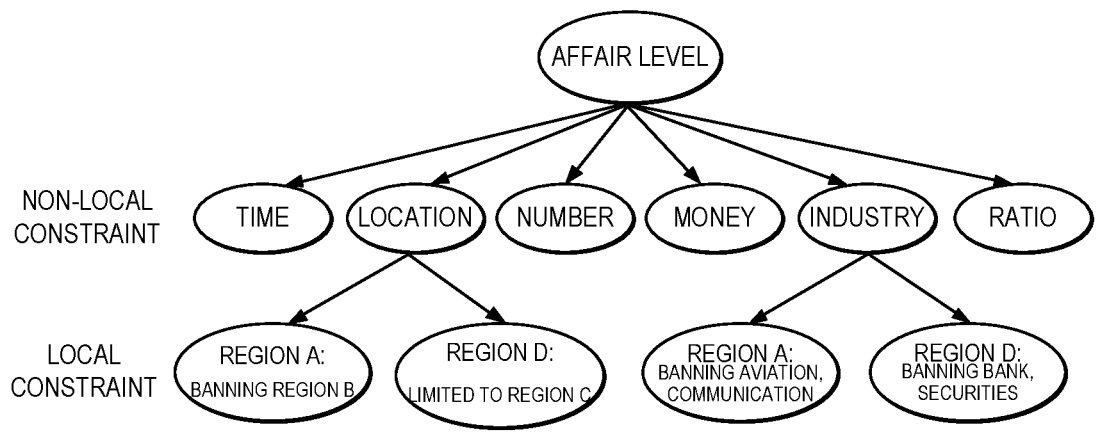
FIG. 5A shows an affair level tree for the multi-level constraint in accordance with embodiments of the present disclosure

FIG. 5A shows an affair level tree for the multi-level constraint in accordance with embodiments of the present disclosure. As show in FIG. 5A, the affair level tree includes a multi-level constraint on the affair information, that is, a non-local constraint and a local constraint. The non-local constraint is associated with both the local region and the non-local region, while the local constraint is only associated with the local region. As shown in FIG. 5A, the root node in a first level has six child nodes in a second level, that is, a time node, a location node, a number node, a money node, an industry node and a ratio node, which collectively form the non-local constraint on the affair information. Some of these nodes in the second level may have nodes in the third level, and the nodes in the third level form the local constraint on the affair information. For example, as illustrated in the local constraint of FIG. 5A, there are two aspects for the region A in local constraint, such as the local constraint for location and the local constraint for industry. For example, as to the local constraint for industry, in the region A, the investment deals in the industry of aviation and communication are banned, while in the region D, the investment deals in the industry of banking and securities are banned.

Figure 5B:
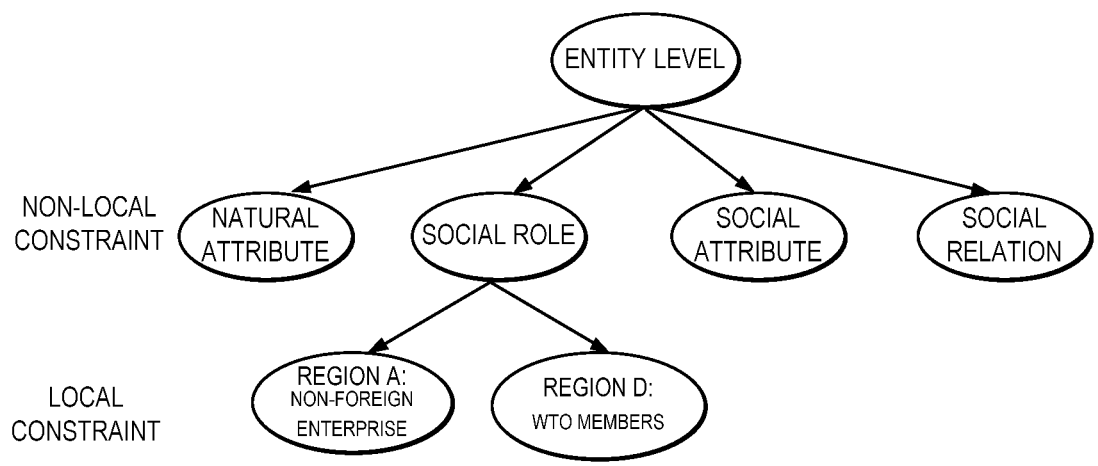
FIG. 5B shows an entity level tree for the multi-level constraint in accordance with embodiments of the present disclosure.

FIG. 5B shows an entity level tree for the multi-level constraint in accordance with embodiments of the present disclosure. As show in FIG. 5B, the entity level tree includes a multi-level constraint on the entity information, that is, a non-local constraint and a local constraint. The root node in a first level has four child nodes in a second level, that is, a natural attribute node, a social role node, a social attribute node and a social relation node, which collectively form the non-local constraint on the affair information. Some of these nodes in the second level may have nodes in the third level, and the nodes in the third level form the local constraint on the affair information. For example, in the local constraint of FIG. 5B, in the region A, the entity in a certain type of deal should be a non-foreign enterprise, while in the region D, the entity in the same type of deal should be a WTO member.

In some embodiments, the affair information and entity information in the description of the affair is associated with the nodes in the affair level tree and the entity level tree. Then, the conformity of the affair is determined by means of determining whether the affair information and entity information conforms to the constraints in all the nodes.

Consequently, the method in the present disclosure can automatically provide the conformity of the cross-regional affairs without any manual operations, thereby reducing the consumption of human resources and the inconformity risk in the cross-regional affairs. Moreover, the multi-level constraint may be generated based on the type of the affair and the location at which the affair is to be executed. Further, the embodiments of the present disclosure may provide the result of conformity determination to the users, and the embodiments of the present disclosure may provide some related regulation(s) with which the affair does not comply in the case that the affair involves an aspect of inconformity.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A computer-implemented method comprising:
   running, by a hardware processor, a characteristic recognition model to extract first characteristics from a description of a cross-regional transaction conducted amongst entities and involving at least crossing a local region and a non-local region, the extracted first characteristics including information relating to the transaction details and entity information involving an entity of the transaction;
accessing an electronic storage device storing a knowledge base of information including regulations for cross-regional transactions;
generating, by the hardware processor, a multi-level constraint based on second characteristics from a knowledge base, the multi-level constraint including a local constraint associated with the local region and a non-local constraint associated with the local region and the non-local region; and
automatically determining, by the hardware processor, a conformity of the cross-regional transaction to the multi-level constraint by:
tagging each of the extracted first characteristics with a definition of the characteristic after the first characteristics are extracted from the description, said tagging comprising:
generating, using the hardware processor, at least one template indicating a plurality of definitions of first characteristics to be extracted, the at least one template generated based on extracted patterns of first characteristics from descriptions of cross-regional transactions;
creating extraction patterns for the template;
employing, at the hardware processor, a pattern matching using the extraction patterns between the template and the description for obtaining each first characteristic and an associated definition from said template;
determining items in the multi-level constraint corresponding to the second characteristics, the multi-level constraint represented as a first tree structure including data nodes indicating items related to the transaction details information, said first tree structure having second layer data nodes indicating a local constraint on the related transaction details information and first layer data nodes collectively forming a non-local constraint on the related transaction details information, said first layer data nodes of said first tree structure selected from the group comprising: a time node, a location node, a number node, a money node, an industry node and a ratio node, and one or more second layer data nodes connecting to a first layer data node of said first tree structure, said one or mode second layer data nodes of said first tree structure comprising a region to form the local constraint of its connected first layer data node of said first tree structure; and a second tree structure including data nodes indicating items related to the entity information, said second tree structure having second layer data nodes indicating a local constraint and first layer nodes collectively forming a non-local constraint on the entity information, said first layer data nodes of said second tree structure selected from the group comprising: a natural attribute node, a social role node, a social attribute node, and a social relation node, and one or more second layer data nodes connecting to a first layer data node of said second tree structure, said one or mode second layer data nodes of said second tree structure comprising a region to form the local constraint of its connected first layer data node of said second tree structure, and the determining items comprising searching each of the first and second tree structures for nodes indicating the items corresponding to the second characteristics;
employing pattern matching for obtaining a definition of each item in the multi-level constraint; and
matching, by the hardware processor, the definitions of the first characteristics to the definitions of the items such that each of the first characteristics are aligned to an item in the multi-level constraint corresponding to the definition of a second characteristic;
using deep semantic association, by the hardware processor, to determine whether the first characteristics conform to the multi-level constraint on the items; and
presenting a result of the conformity determining to a user via an interface device,
wherein the automatic determining and presenting a conformity result of the cross-regional transaction to the multi-level constraint reduces a consumption of human resources.

2. The method of claim 1, wherein the generating a multi-level constraint comprises:
determining a type of the transaction;
selecting, from the regulations stored in the knowledge base, regulations corresponding to the type of the transaction; and
generating the multi-level constraint for the characteristics based on the selected regulations.

3. The method of claim 1, wherein the generating a multi-level constraint comprises:
determining, from the transaction information, a location at which the transaction is to be executed;
determining the local region based on the location of the transaction;
determining, from the regulations stored in the knowledge base, local regulations associated with the determined local region; and
generating the local constraint for the characteristics based on the determined local regulations.

4. The method of claim 1, wherein the determining conformity of the transaction to the multi-level constraint comprises:
determining first conformity of the transaction to the multi-level constraint based on the transaction information; and
determining second conformity of the entity to the multi-level constraint based on the entity information.

5. The method of claim 1, further comprising:
in response to determining an aspect of the transaction is in inconformity with the multi-level constraint,
providing a first indication of the aspect of the transaction, and
providing a second indication of at least one regulation related to the aspect.

6. The method of claim 1, further comprising:
performing, for each characteristic, by the processor, a cross-regional constraint linkage based on said matching the definitions of the characteristics and the items.

7. A device comprising:
a hardware processing unit;
a memory coupled to the processing unit and storing instructions thereon, the instructions, when executed by the hardware processing unit, performing acts configuring the hardware processing unit to:
run a characteristic recognition model to extract first characteristics from a description of a cross-regional transaction conducted amongst entities and involving at least crossing a local region and a non-local region, the extracted first characteristics including information relating to the transaction details and entity information involving an entity of the transaction;

access an electronic storage device storing a knowledge base of information including regulations for cross-regional transactions;

generate a multi-level constraint based on second characteristics from the regulations information stored in the knowledge base, the multi-level constraint including a local constraint associated with the local region and a non-local constraint associated with the local region and the non-local region; and automatically determine a conformity of the cross-regional transaction to the multi-level constraint, said hardware processing unit determining a conformity by:

tagging each of the extracted first characteristics with a definition of the characteristic after the first characteristics are extracted from the description, said tagging comprising:

generating at least one template indicating a plurality of definitions of first characteristics to be extracted, the at least one template generated based on extracted patterns of first characteristics from descriptions of cross-regional transactions;

creating extraction patterns for the template;

employing, at the hardware processing unit, a pattern matching using the extraction patterns between the template and the description for obtaining each first characteristic and an associated definition from said template;

determining items in the multi-level constraint corresponding to the second characteristics, the multi-level constraint represented as a first tree structure including data nodes indicating items related to the transaction details information, said first tree structure having second layer data nodes indicating a local constraint on the related transaction details information and first layer data nodes collectively forming a non-local constraint on the related transaction details information, said first layer data nodes of said first tree structure selected from the group comprising: a time node, a location node, a number node, a money node, an industry node and a ratio node, and one or more second layer data nodes connecting to a first layer data node of said first tree structure, said one or mode second layer data nodes of said first tree structure comprising a region to form the local constraint of its connected first layer data node of said first tree structure; and a second tree structure including data nodes indicating items related to the entity information, said second tree structure having second layer data nodes indicating a local constraint and first layer nodes collectively forming a non-local constraint on the entity information, said first layer data nodes of said second tree structure selected from the group comprising: a natural attribute node, a social role node, a social attribute node, and a social relation node, and one or more second layer data nodes connecting to a first layer data node of said second tree structure, said one or mode second layer data nodes of said second tree structure comprising a region to form the local constraint of its connected first layer data node of said second tree structure, and the determining items comprising searching each of the first and second tree structures for nodes indicating the items corresponding to the second characteristics;

employing pattern matching for obtaining a definition of each item in the multi-level constraint; and matching, by the hardware processing unit, the definitions of the first characteristics to the definitions of the items such that each of the first characteristics are aligned to an item in the multi-level constraint corresponding to the definition of a second characteristic;

using deep semantic association, by the hardware processing unit, to determine whether the first characteristics conform to the multi-level constraint on the items; and presenting a result of the conformity determining to a user via an interface device, wherein the automatic determining and presenting a conformity result of the cross-regional transaction to the multi-level constraint reduces a consumption of human resources.

8. The device of claim 7, wherein the generating a multi-level constraint comprises:

determining a type of the transaction;

selecting, from the regulations stored in the knowledge base, regulations corresponding to the type of the transaction; and generating the multi-level constraint for the characteristics based on the selected regulations.

9. The device of claim 7, wherein the generating a multi-level constraint comprises:

determining, from the affair information, a location at which the transaction is to be executed;

determining the local region based on the location of the transaction;

determining, from the regulations stored in the knowledge base, local regulations associated with the determined local region; and generating the local constraint for the characteristics based on the determined local regulations.

10. The device of claim 7, wherein the determining conformity of the transaction to the multi-level constraint comprises:

determining first conformity of the affair to the multi-level constraint based on the transaction information; and determining second conformity of the entity to the multi-level constraint based on the entity information.

11. The device of claim 7, wherein the acts further comprise:

in response to determining an aspect of the transaction is in inconformity with the multi-level constraint, providing a first indication of the aspect of the transaction, and providing a second indication of at least one regulation related to the aspect.

12. The device of claim 7, wherein the processing unit is further configured to perform:

for each characteristic a cross-regional constraint linkage based on said matching the definitions of the characteristics and the items.

13. A computer program product being tangibly stored on a non-transient machine-readable medium and comprising machine-executable instructions, the instructions, when executed on a processor, causing the processor to:

run a characteristic recognition model to extract first characteristics from a description of a cross-regional transaction conducted amongst entities and involving at least crossing a local region and a non-local region, the extracted first characteristics including information relating to the transaction details and entity information involving an entity of the transaction;

access an electronic storage device storing a knowledge base of information including regulations for cross-regional transactions;

generate a multi-level constraint based on second characteristics from the regulations information stored in the knowledge base, the multi-level constraint including a local constraint associated with the local region and a non-local constraint associated with the local region and the non-local region; and automatically determine conformity of the cross-regional transaction to the multi-level constraint, said machine-executable instructions configuring said processor unit to determine a conformity by:

tagging each of the extracted first characteristics with a definition of the characteristic after the first characteristics are extracted from the description, said tagging comprising:

generating at least one template indicating a plurality of definitions of first characteristics to be extracted, the at least one template generated based on extracted patterns of first characteristics from descriptions of cross-regional transactions;

creating extraction patterns for the template;

employing, at the processing unit, a pattern matching using the extraction patterns between the template and the description for obtaining each first characteristic and an associated definition from said template;

determining items in the multi-level constraint corresponding to the second characteristics, the multi-level constraint represented as a first tree structure including data nodes indicating items related to the transaction details information, said first tree structure having second layer data nodes indicating a local constraint on the related transaction details information and first layer data nodes collectively forming a non-local constraint on the related transaction details information, said first layer data nodes of said first tree structure selected from the group comprising: a time node, a location node, a number node, a money node, an industry node and a ratio node, and one or more second layer data nodes connecting to a first layer data node of said first tree structure, said one or mode second layer data nodes of said first tree structure comprising a region to form the local constraint of its connected first layer data node of said first tree structure; and a second tree structure including data nodes indicating items related to the entity information, said second tree structure having second layer data nodes indicating a local constraint and first layer nodes collectively forming a non-local constraint on the entity information, said first layer data nodes of said second tree structure selected from the group comprising: a natural attribute node, a social role node, a social attribute node, and a social relation node, and one or more second layer data nodes connecting to a first layer data node of said second tree structure, said one or mode second layer data nodes of said second tree structure comprising a region to form the local constraint of its connected first layer data node of said second tree structure, and the determining items comprising searching each of the first and second tree structures for nodes indicating the items corresponding to the second characteristics;

employing pattern matching for obtaining a definition of each item in the multi-level constraint; and matching, by the processor, the definitions of the first characteristics to the definitions of the items such that each of the first characteristics are aligned to an item in the multi-level constraint corresponding to the definition of a second characteristic;

using deep semantic association, by the hardware processor, to determine whether the first characteristics conform to the multi-level constraint on the items; and presenting a result of the conformity determining to a user via an interface device, wherein the automatic determining and presenting a conformity result of the cross-regional transaction to the multi-level constraint reduces a consumption of human resources.

14. The computer program product of claim 13, wherein the instructions, when executed on the processor, cause the processor to:

determine a type of the transaction;

select, from the regulations stored in the knowledge base, regulations corresponding to the type of the transaction; and generate the multi-level constraint for the characteristics based on the selected regulations.

15. The computer program product of claim 13, wherein the instructions, when executed on the processor, cause the processor to:

determine, from the transaction information, a location at which the transaction is to be executed;

determine the local region based on the location of the transaction;

determine, from the regulations stored in the knowledge base, local regulations associated with the determined local region; and generate the local constraint for the characteristics based on the determined local regulations.

16. The computer program product of claim 13, wherein the instructions, when executed on the processor, cause the processor to:

performing, for each characteristic a cross-regional constraint linkage based on said matching the definitions of the characteristics and the items.

* * * * *